United States Patent
Caviedes et al.

(10) Patent No.: US 7,606,423 B2
(45) Date of Patent: Oct. 20, 2009

(54) METHOD AND APPARATUS FOR BLOCKING ARTIFACT DETECTION AND MEASUREMENT IN BLOCK-CODED VIDEO

(75) Inventors: Jorge E. Caviedes, Mesa, AZ (US); Mahesh M. Subedar, Tempe, AZ (US); Wen-Tsung Tang, Saratoga, CA (US); Rony Ferzli, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 11/238,710

(22) Filed: Sep. 29, 2005

(65) Prior Publication Data
US 2007/0071356 A1 Mar. 29, 2007

(51) Int. Cl.
*G06K 9/40* (2006.01)
*G06T 7/00* (2006.01)

(52) U.S. Cl. ...................................... 382/199; 382/268
(58) Field of Classification Search .................. 382/199
See application file for complete search history.

(56) References Cited

U.S. PATENT DOCUMENTS

| 6,600,839 B2 * | 7/2003 | Mancuso et al. | 382/268 |
| 6,823,089 B1 * | 11/2004 | Yu et al. | 382/268 |
| 7,031,552 B2 * | 4/2006 | Kim | 382/275 |

OTHER PUBLICATIONS

K. Ramkishor and Pravin Karandikar, "A Simple and Efficient Deblocking Algorithm for Low Bit-Rate Video Coding", 6pgs.
Yuh-Feng Hsu and Yung-Chang Chen, "A New Adaptive Separable Median Filter for Removing Blocking Effects", IEEE Transactions on Consumer Electronics, vol. 39, No. 3, Aug. 1993, pp. 510-513.
Yuk-Hee Chan, Sung-Wai Hong and Wan-Chi Siu, "A practical post-processing technique for real-time block-based coding system", The Hong Kong Ploytechnic University Grant A/C No. 350.255.A3.420, pp. 1-6.

* cited by examiner

*Primary Examiner*—Jon Chang
(74) *Attorney, Agent, or Firm*—Buckley, Maschoff & Talwalkar LLC (57) ABSTRACT

A method includes detecting vertical edge pixels in an image and analyzing the detected vertical edge pixels by horizontal location in the image to detect a spatial periodicity in the detected vertical edge pixels. The method further includes detecting horizontal edge pixels in the image, and analyzing the detected horizontal edge pixels by vertical location in the image to detect a spatial periodicity in the detected horizontal edge pixels.

15 Claims, 13 Drawing Sheets

| OFFSET | GRID 8 | GRID 12 |
|---|---|---|
| 0 | (GRID$_8$,OFFSET$_0$) | |
| 1 | | |
| 2 | | |
| 3 | | (GRID$_{12}$,OFFSET$_3$) |
| 4 | | |
| 5 | | |
| 6 | | |
| 7 | | |
| 8 | | |
| 9 | | |
| 10 | | |
| 11 | | |

METHOD AND APPARATUS FOR BLOCKING ARTIFACT DETECTION AND MEASUREMENT IN BLOCK-CODED VIDEO

BACKGROUND

Compression encoding of video signals is widely used. In at least some of the most common compression encoding standards, such as MPEG-2 and MPEG-4, fields or frames of video signals are divided into blocks of pixels (8×8) for coding purposes. A disadvantage of such compression-encoding schemes is that blocking artifacts may be produced upon recovery (decoding) of the video signal. Various proposals have been made for blocking artifact reduction after decoding of compression-encoded video signals, but such proposals have assumed that the positioning and size of the block grid relative to the image plane is known. However, if side information from the decoder about the block grid is not available, the size of blocks and the offset of the grid, if any, may not be known to the blocking artifact reduction function. As a result, satisfactory blocking artifact reduction may not occur.

DETAILED DESCRIPTION

Figure 1:
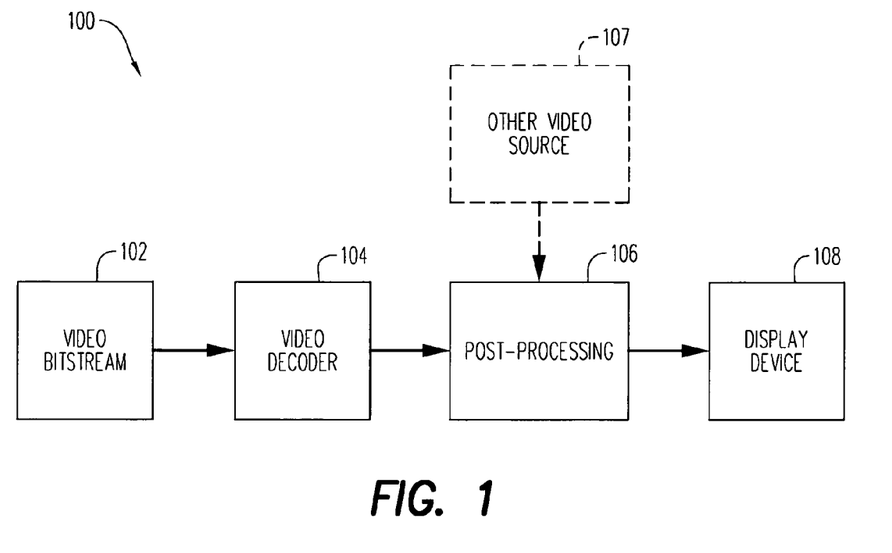
FIG. 1 is a block diagram of an apparatus which generates a video display from a video bitstream in accordance with some embodiments.

FIG. 1 is a block diagram of an apparatus 100 which generates a video display from a video bitstream in accordance with some embodiments.

The apparatus 100 includes a source 102 of a video signal bitstream. For example, the video signal source 102 may receive a video signal via a communication channel (which is not separately shown) or may reproduce a video signal from a storage medium such as a DVD or a hard disk drive. For example, the video signal source may include a video tuner, a satellite earth station, or a DVD player. It will be assumed that the video signal bitstream represents a video signal that has been compression encoded using a block coding technique, e.g., in accordance with one of the MPEG compression standards. The video signal source 102 may operate in accordance with conventional practices.

The apparatus 100 also includes a video decoder 104 which is coupled to the video signal source to de-compress the video signal bitstream supplied by the video signal source 102. The video decoder 104 may operate in accordance with conventional principles, and may tend to produce blocking artifacts in the output video image.

The apparatus 100 further includes a post-processing block 106 which is coupled to the video decoder 104. The post-processing block 106 performs one or more kinds of post processing on the decompressed video signal output from the video decoder 104. For example, the post-processing block 106 may perform block grid detection and block artifact reduction processing as in one or more of the embodiments described below. Other types of post processing, such as noise reduction filtering, may also be performed by the post-processing block 106.

In some cases, the input to the post-processing block 106 may be received from a video signal source (indicated in phantom at 107) other than the video decoder 104. For example, the other video signal source 107 may originate as an analog signal that has been coded and decoded, and may be the "A/V" or "EXT" input of a television, VCR or DVD player, or may be an off-the-air analog decoder. In these cases, no grid information may be available. In other cases, the grid information from the decoder 104 may be unreliable, or the decoder 104 may be a separate device from the post-processing block 106, or may not operate to provide grid and/or re-scaling information.

Pre-scaling and subsequent re-scaling of an image may cause grid artifacts to have a size other than 8×8. Images may be pre-scaled (reduced in size) to reduce bandwidth requirements. For example, if an image is pre-scaled by ⅔, block-encoded with 8-pixel wide blocks, and then re-scaled by ½, a 12 pixel grid may result. If an image is pre-scaled by ¾, block-encoded with 8-pixel wide blocks, and then re-scaled by ⅘, the nominal grid size may be 10.66, which because of effective rounding to integer pixel spacing may be presented as a 10/11 (10-11-11) grid.

In addition, the apparatus 100 includes a display device 108, such as a conventional television set or a computer display monitor. The display device 108 displays the video signal that is output from the post-processing block 106.

Figure 2:
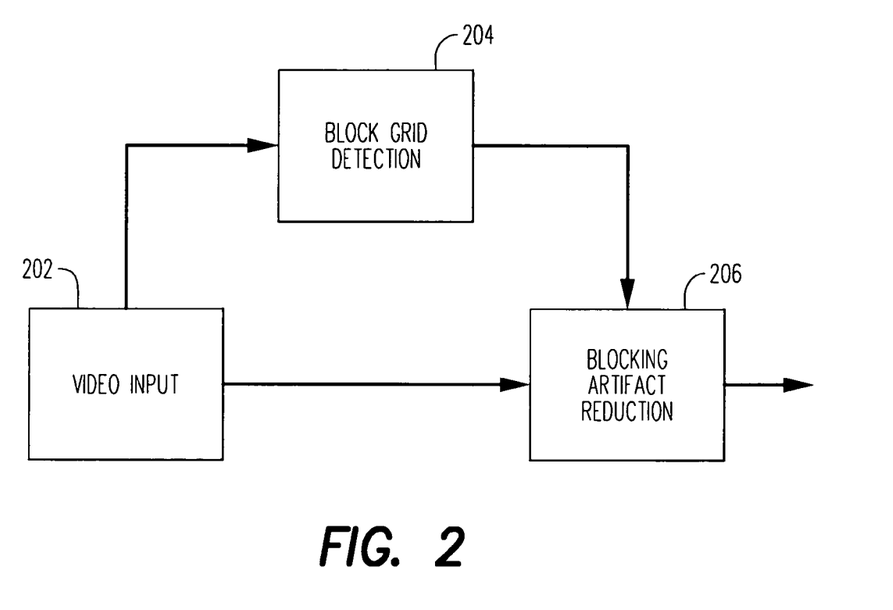
FIG. 2 is a functional block diagram that illustrates some operations of a post-processing block that is part of the apparatus of FIG. 1.

FIG. 2 is a functional block diagram that illustrates aspects of a block grid detection and block artifact reduction process performed in the post-processing block 106 in accordance with some embodiments.

Block 202 represents the post-processing block 106 (or a sub-block thereof) receiving an input video signal (e.g., directly or indirectly from the video decoder 104) that is to be subjected to block grid detection/block artifact reduction. Block 204 represents circuitry (specially designed or programmed) provided in accordance with some embodiments to apply a block grid detection process that will be described below in more detail. Block 206 represents circuitry that is coupled to receive the input video signal to perform blocking artifact reduction thereon. Block 206 is also coupled to the block grid detection circuitry to receive input from the block grid detection circuitry 204 as to the size and offset of a block grid present in the input video signal. The block 206 may perform blocking artifact reduction on the input video signal in accordance with conventional principles, guided by the output of the block grid detection circuitry as to block size and grid offset. Alternatively, the block 206 may implement block artifact reduction in accordance with techniques that have not previously been known.

Figure 3:
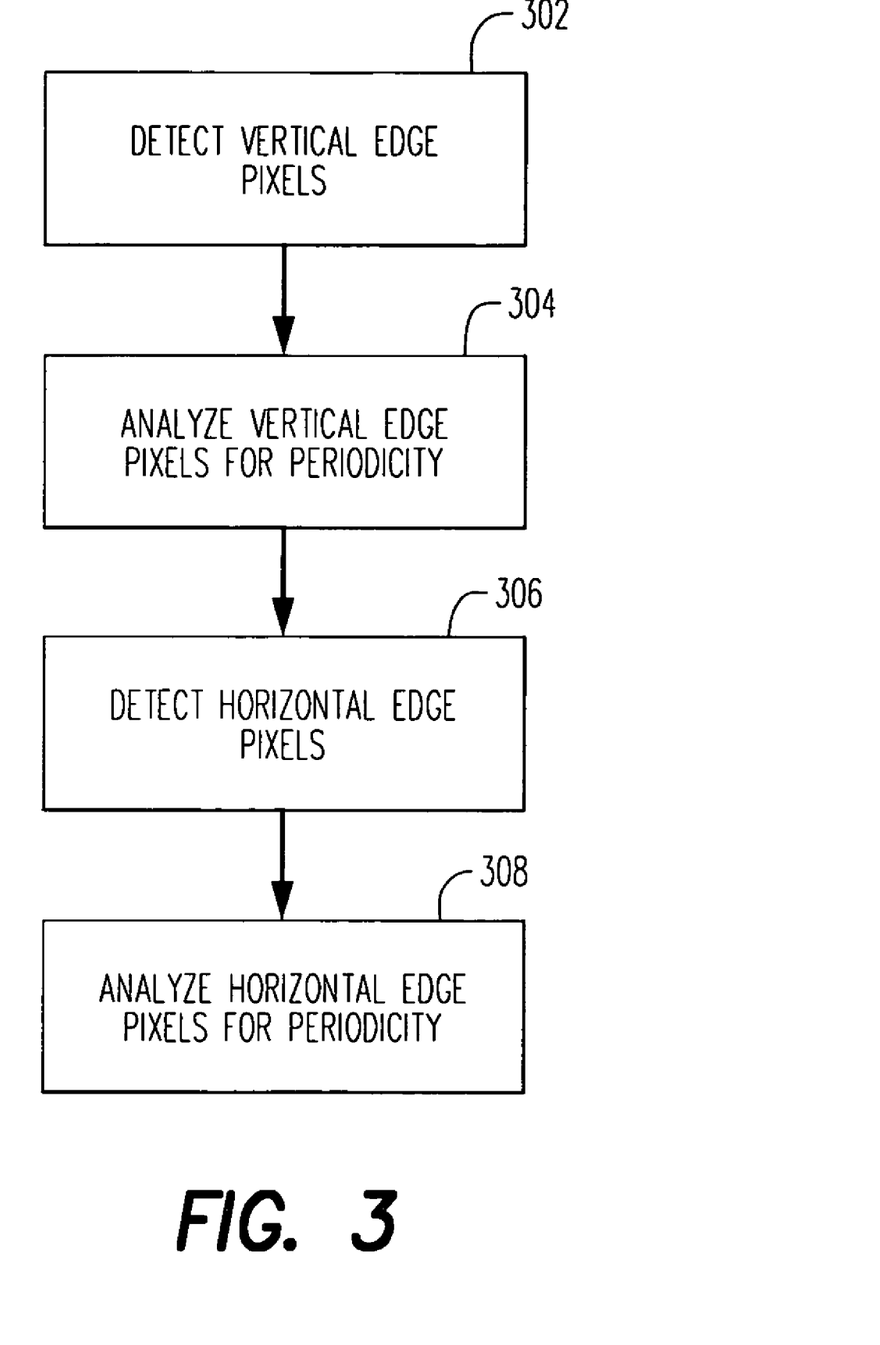
FIG. 3 is a high-level flow chart that illustrates a process performed by a block grid detection circuit that is part of the post-processing block of FIG. 2.

FIG. 3 is a high-level flow chart that illustrates a process performed by block grid detection circuitry 204 of FIG. 2. Referring to FIG. 3, as indicated at 302, the block grid detection circuitry 204 is operative to detect vertical edge pixels in a field or frame of the video signal that is currently being processed. As used herein and in the appended claims, a "vertical edge pixel" is a pixel that is part of a vertically oriented edge in the image frame/field or that is detected from changes in pixel values in a horizontal direction. A computationally efficient approach for detecting vertical edge pixels of interest for block grid detection will be described below.

As indicated at 304 in FIG. 3, the vertical edge pixels that are detected by the process stage indicated at 302 are analyzed in accordance with some embodiments to detect a spatial periodicity in the vertical edge pixels. Details of such analysis will also be described below.

As indicated at 306, the block grid detection circuitry 204 is also operative to detect horizontal edge pixels in the current field or frame of the video signal. As used herein and in the appended claims, a "horizontal edge pixel" is a pixel that is part of a horizontally oriented edge in the image frame/field or that is detected from changes in pixel values in a vertical direction. In some embodiments, the technique for detecting horizontal edge pixels of interest is similar to that employed for detecting vertical edge pixel, differing only in terms of the direction in the image plane in which detection processing is applied.

As indicated at 308, the horizontal edge pixels that are detected by the process stage at 306 are analyzed in accordance with some embodiments to detect a spatial periodicity in the horizontal edge pixels.

As is the case with respect to other processes/flow charts described or presented herein, FIG. 3 and the above discussion thereof are not meant to imply a fixed order of performing the illustrated/described process stages. Rather, the stages of each process may be performed in any order that is practicable. For example, detection of horizontal edge pixels may precede detection of vertical edge pixels and/or may be performed simultaneously therewith, or intermittently between times when vertical edge pixels are being detected. Furthermore, the analyses called for by 304 and 308 may overlap with each other and with a portion of the detection of the horizontal and vertical edge pixels.

Figure 4:
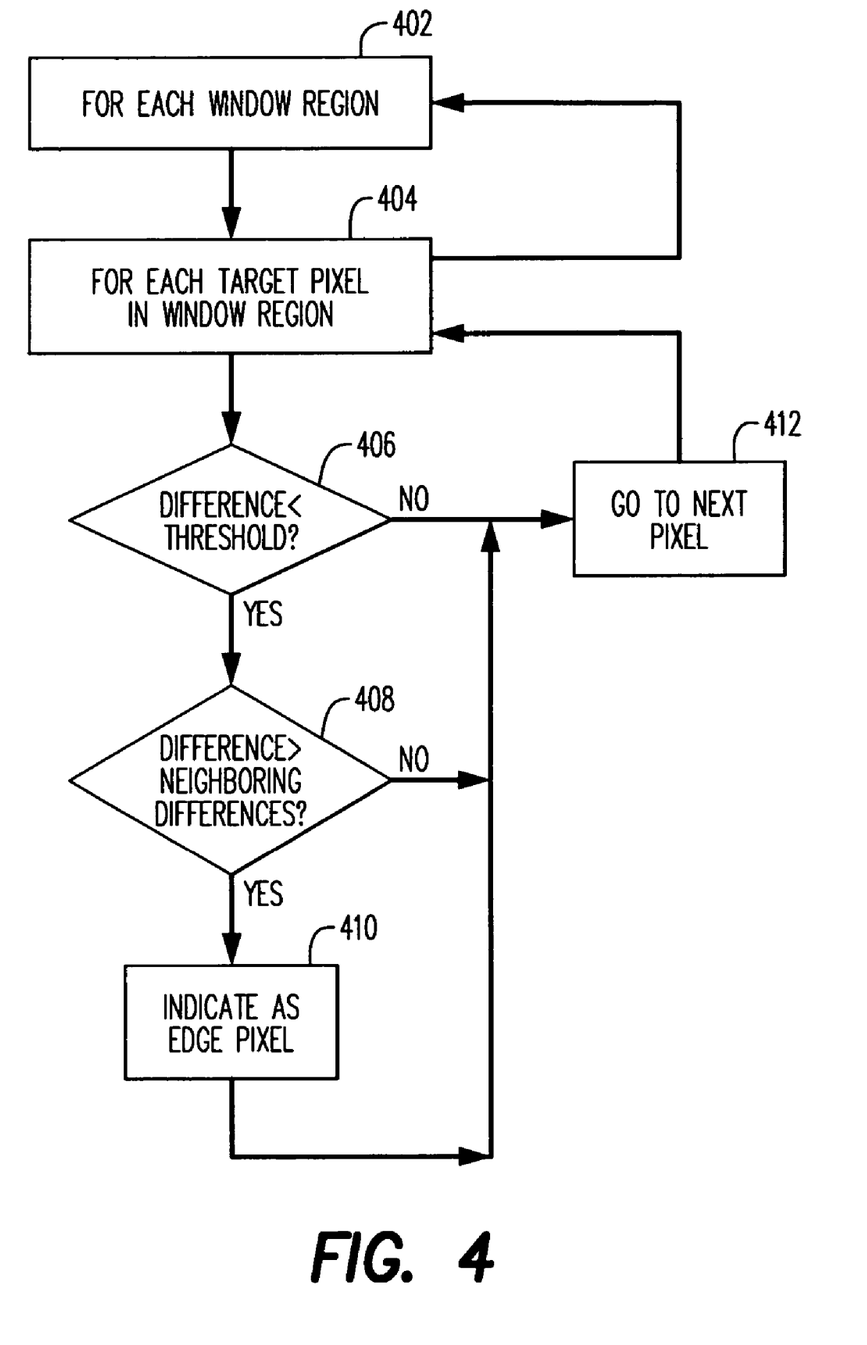
FIG. 4 is a flow chart that illustrates details of edge pixel detection processing that is included in the process of FIG. 3.

FIG. 4 is a flow chart that illustrates details of edge pixel detection processing indicated at 302 and 306 in FIG. 3. The process of FIG. 4 may be applied to both vertical edge pixel detection and to horizontal edge pixel detection, except that with respect to detecting vertical edge pixels the process is applied in a horizontal direction (i.e., along a row of pixels), and with respect to detecting horizontal edge pixels the process is applied in a vertical direction (i.e., along a column of pixels).

In some embodiments, the edge pixel detection processing is, as indicated at 402, sequentially performed within successive window regions of the image plane. For example, an n×m (n,m both integers) processing window may be used, with n and m both equal to 12 in some embodiments, and with each window region overlapping its neighboring regions in all directions to the extent of 3 pixels in some embodiments.

Figure 5:
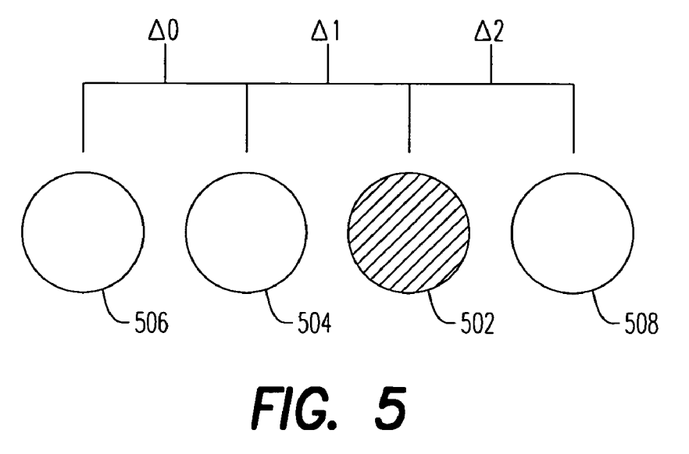
FIGS. 5 and 6 schematically illustrate aspects of the process of FIG. 4.

As indicated at 404, the edge detection processing may, in each processing window, be applied at each target pixel in the processing window. A "target pixel" is a pixel in the current window for which the window also includes neighboring pixels required for the detection process. FIG. 5 schematically illustrates aspects of the detection of vertical edge pixels. In FIG. 5 the target pixel (shaded) is indicated by reference numeral 502. The neighboring pixel immediately to the left of target pixel 502 is indicated by reference numeral 504. The pixel immediately to the left of pixel 504 is indicated by reference numeral 506. The neighboring pixel immediately to the right of the target pixel 502 is indicated by reference numeral 508. The edge direction processing may entail calculating: (a) the (absolute value of the) difference $\Delta 1$ between the value of target pixel 502 and the value of pixel 504 to its left; (b) the (absolute value of the) difference $\Delta 0$ between the values of pixels 504 and 506; and (c) the (absolute value of the) difference $\Delta 2$ between the value of the target pixel 502 and the value of pixel 508 to its right. As illustrated in FIG. 4, the target pixel is to be classified as a vertical edge pixel for block grid detection purposes if it is a weak edge. This determination, in turn, is based on the difference $|\Delta 1|$ being less than a threshold and being greater than both of the neighboring differences $|\Delta 0|$ and $|\Delta 2|$. If both of these conditions are met (indicated respectively at 406 and 408 in FIG. 4), then the target pixel is classified as a vertical edge pixel (410 in FIG. 4). If either one of the conditions is not met, then processing proceeds (412 in FIG. 4) to the next target pixel in the current processing window for a further iteration of the loop headed by block 404. In some embodiments, the threshold applied at 406 may be 35, assuming a pixel value range of 0-255. Indication of the target pixel as a vertical edge pixel may be reflected by incrementing a column total for the column in which the target pixel is located. After the loop headed by block 404 is performed with respect to every target pixel in the current processing window, the process is repeated with respect to the next processing window. In this way all or a significant part of the image plane may be processed for edge detection purposes.

Figure 6:
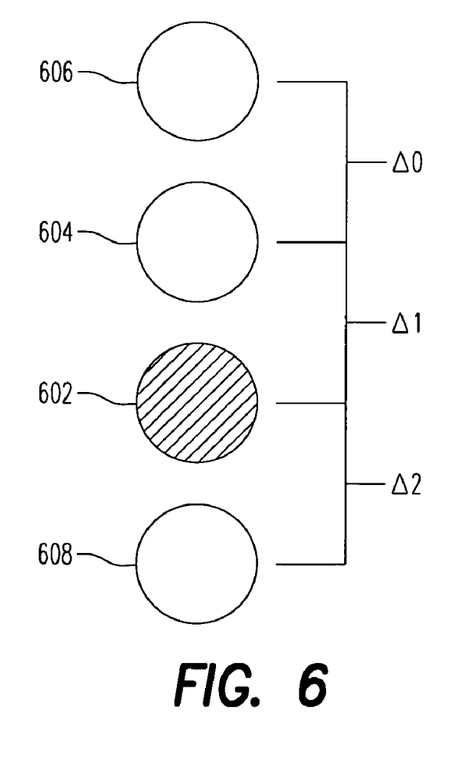

The same process may be applied for detection of horizontal edge pixels, except that the process is applied along a column, as schematically illustrated in FIG. 6, rather than along a row, as has been described in connection with FIGS. 4 and 5. In FIG. 6, the shaded target pixel 602 is shown, along with its neighboring pixel 604 that is immediately above target pixel 602. Also shown are pixel 606 that is immediately above pixel 604, and pixel 608 that is immediately below the target pixel 602. For application of the process of FIG. 4, and particularly decision blocks 406, 408, $|\Delta 1|$ is calculated as the absolute value of the difference between the value of target pixel 602 and the value of pixel 604; $|\Delta 0|$ is calculated as the absolute value of the difference between the values of pixels 604 and 606; and $|\Delta 2|$ is calculated as the absolute value of the difference between the value of target pixel 602 and the value of pixel 608. Indication of a target pixel as a horizontal edge pixel may be reflected by incrementing a row total for the row in which the target pixel is located.

Figure 7:
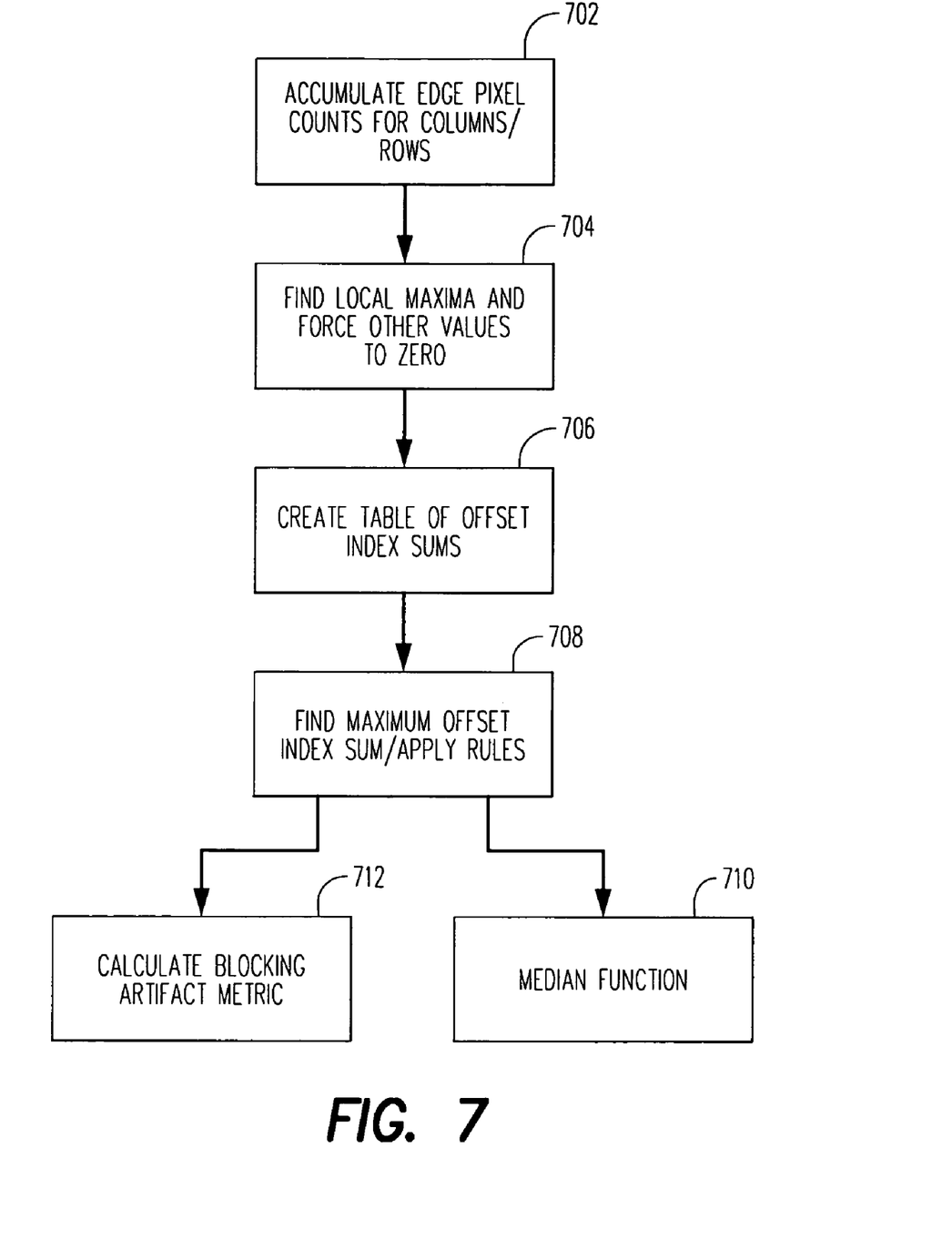
FIG. 7 is a flow chart that illustrates details of periodicity analysis of edge pixels that is part of the processing in FIG. 3.

FIG. 7 is a flow chart that illustrates details of periodicity analysis of edge pixels that is part of the processing in FIG. 3.

At 702 in FIG. 7, counts of vertical edge pixels so identified by the process of FIG. 4 are accumulated for each column of the image plane, and counts of horizontal edge pixels so identified by the process of FIG. 4 are accumulated for each row of the image plane. While, conceptually, this accumulating of counts of edge pixels may be considered part of the analysis of the edge pixels, in practice the accumulation of counts may be integrated with the process of detecting the edge pixels. Next, at 704, the array of column totals is analyzed to determine which of the column totals are local maxima in the array, and all other column totals are reset to zero. Also, the array of row totals is analyzed to determine which of the row totals are local maxima in the array, and all other row totals are reset to zero. For example, each column total is reset to zero unless it is larger than both the total for the column immediately to the left and the total for the column immediately to the right. Similarly, each row total is reset to zero unless it is larger than both the total for the row immediately above and the total for the row immediately below.

Figure 7A:
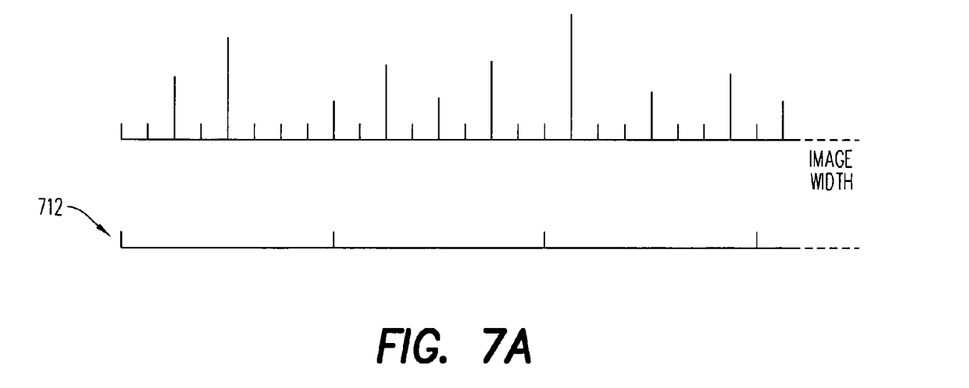
FIG. 7A shows an example stem plot that illustrates aspects of the process of FIG. 7.

FIG. 7A shows an example stem plot of an array of column totals that may result from 704.

Figure 8:
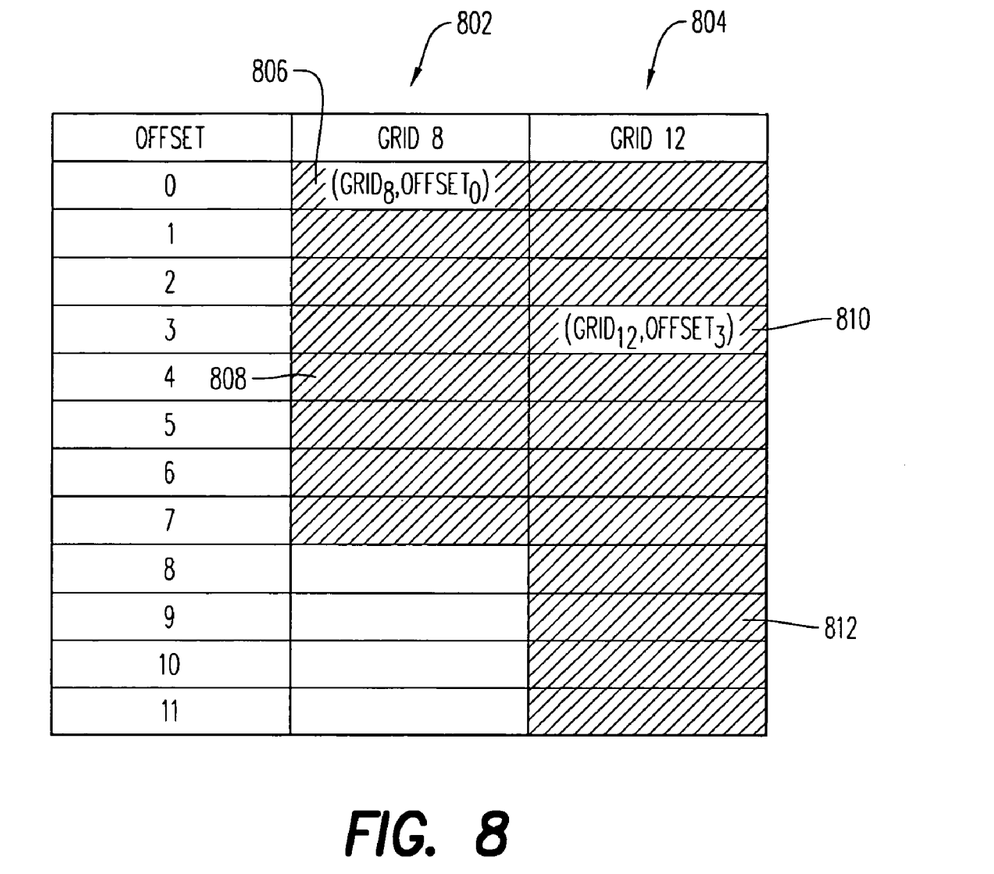
FIG. 8 is an example layout of a table used in the analysis of FIG. 7.

Following 704 is 706, at which column totals are summed at regular horizontal intervals to produce a table of offset index sums in the format illustrated in FIG. 8. In the table of FIG. 8, the totals for the potential offset locations for a potential grid size 8 are listed in column 802 of the table. Also, the totals for the potential offset locations for a potential grid size 12 are listed in column 804. For example, for grid size 8/offset 0, the column totals for columns 1, 9, 17, etc. are summed and the resulting offset index sum is entered in cell 806 in the table. (The loci of the column totals that may be summed for the grid size 8/offset 0 offset index sum are indicated by plot 712 in FIG. 7A.) As another example, for grid size 8/offset 4, the column totals for columns 5, 13, 21, etc. are summed and the resulting offset index sum is entered in cell 808. (It will be appreciated that the non-shaded cells in column 802 are left blank.) As still another example, for grid size 12/offset 3, the column totals for columns 4, 16, 28, etc. are summed and the resulting offset index sum is entered in cell 810. As yet another example, for grid size 12/offset 9, the column totals for columns 10, 22, 34, etc. are summed and the resulting offset index sum is entered in cell 812.

From the preceding discussion and examples, it will be appreciated how all of shaded cells in the table of FIG. 8 may be filled in with offset index sums, but the following general formula may be used. For the cell corresponding to potential grid size X and potential offset Y, the entry is the sum of the column totals for the columns $(Y+1)+X*N$, where $N=0, 1, 2, \ldots, Z-1$; Z being equal to the width of the image plane in columns, divided by X.

A similar table (FIG. 11) may be constructed by summing row totals that reflect detected horizontal edge pixels.

Figure 9:
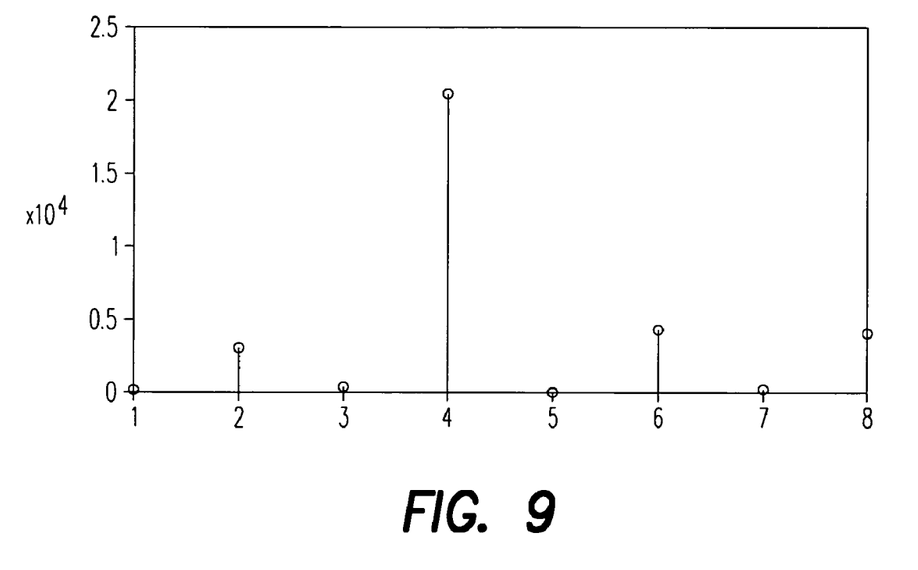
FIG. 9 is an example stem plot illustration of data that might be present in the table of FIG. 8.

At 708, an analysis is performed with respect to the figures in the offset index sum table. Initially the maximum (max_8_horiz_index_sum) of the values listed in column 802 (FIG. 8) is found and the corresponding grid size (i.e., 8) and offset are selected as a candidate for the horizontal grid size and offset to be determined by the block grid detection circuitry. FIG. 9 is an example stem plot of values that might be listed in column 802 in a case where the maximum value is the offset index sum corresponding to an offset of 3.

The corresponding grid size/offset are indeed reported as the grid size and offset to be found if the following 4 conditions are met:

Condition 1.1: Max_8_horiz_index_sum is greater than 1.2 times the maximum (max_12_horiz_index_sum) of the values listed in column 804 (FIG. 8).

Condition 1.2: Max_8_horiz_index_sum is greater than 1.2 times each other value listed in column 802.

Condition 1.3: The minimum of the values listed in column 802 is less than 0.25 times max_8_horiz_index_sum.

Condition 1.4: The number of column totals that contributed to max_8_horiz_index-sum (i.e., the number of nonzero column totals that correspond to the offset that corresponds to max_8_horiz_index-sum) is greater than 0.2 times the image width (in columns) divided by 8.

If at least one of the above 4 conditions is not met, then further analysis is performed to determine whether a horizontal grid size of 12 is detected. Initially at this stage the grid size (i.e., 12) and the offset that corresponds to max_12_horiz_index_sum are selected as a candidate for the horizontal grid size and offset to be determined by the block grid detection circuitry. This candidate is indeed reported as the grid size and offset to be found if the following three conditions are met:

Condition 2.1: Max_12_horiz_index_sum is at least 1.2 times each other value listed in column 804.

Condition 2.2: The minimum of the values listed in column 804 is less than 0.25 times max_12_horiz_index_sum.

Condition 2.3: The number of column totals that contributed to max_12_horiz_index_sum (i.e., the number of non-zero column totals that correspond to the offset that corresponds to max_12_horiz_index_sum) is greater than 0.2 times the image width (in columns) divided by 8.

Figure 10A:
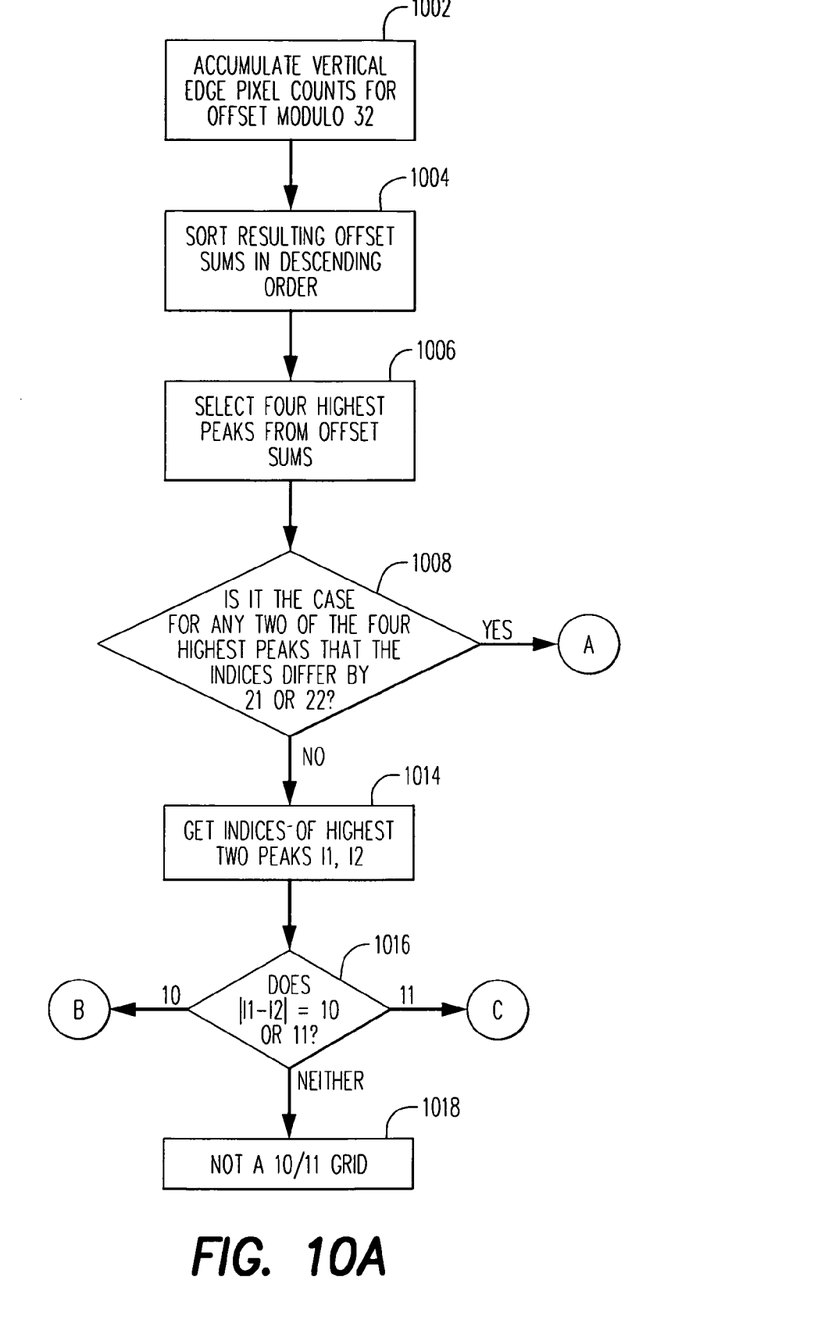
FIGS. 10A and 10B together form a flow chart that illustrates a process that may be performed as a further part of the analysis of FIG. 7.
Figure 10B:
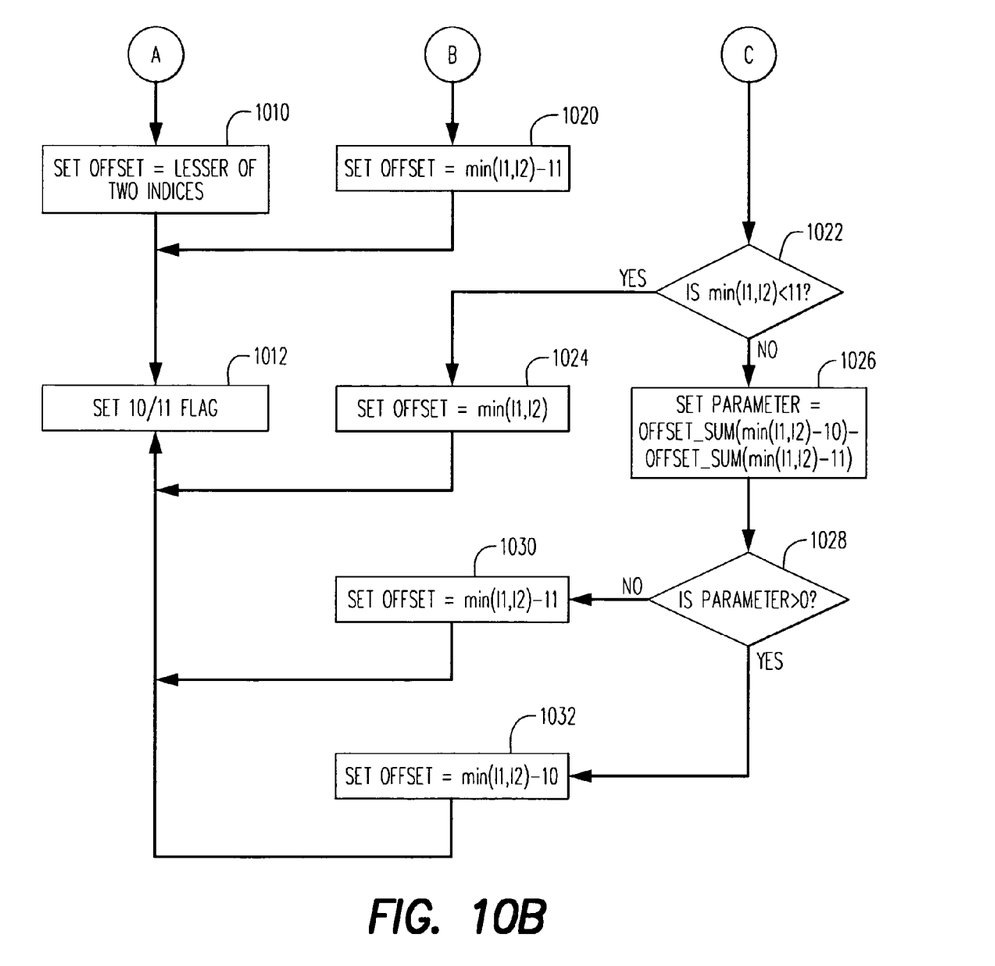

If at least one of the above three conditions is not met, then further analysis is performed to determine whether a so-called 10/11 horizontal grid is present. In a 10/11 horizontal grid, the blocks used for compression are formed in a repeating horizontal pattern of 10 pixels wide—11 pixels wide—11 pixels wide. FIGS. 10A and 10B together form a flow chart that illustrates a process for determining whether to set a "10/11 flag" as part of a process for potentially detecting a 10/11 horizontal grid.

At 1002 in FIG. 10A, the column totals as after stage 704 of FIG. 7 are considered, and the resulting column totals are accumulated in each of 32 groups of columns, each of the groups corresponding to an offset modulo 32 in a horizontal direction. For example, the first resulting offset sum (offset 0) may be calculated as the sum of the column totals for columns 1, 33, 65, 97, etc.; the second resulting offset sum (offset 1) may be calculated as the sum of the column totals for columns 2, 34, 66, 98, etc.; and continuing likewise through offset 31.

Then, at 1004, the offset sums are sorted in descending order, and at 1006, the four highest of the offset sums are selected. The indices of the four selected peak offset sums are then considered, and in particular it is determined at 1008 whether any two of the indices differ by 21 or 22. If so, then the offset to be (potentially) reported is set as the lesser of those two indices (1010 in FIG. 10B) and the 10/11 flag is set (1012 in FIG. 10B).

Referring again to FIG. 10A, and considering again the determination made at 1008, if it is not the case that any two of the indices of the four peaks differ by 21 or 22, then as indicated at 1014 (FIG. 10A), the indices (I1, I2) for the two highest values of the offset sums are considered, and it is determined at 1016 whether the absolute value of the difference between I1 and I2 is equal to 10 or 11. If such is not the case, then as indicated at 1018, no 10/11 horizontal grid is detected (and, indeed, no horizontal grid of any size is detected).

If at 1016 it is determined that the absolute value of the difference between I1 and I2 is equal to 10, then 1020 in FIG. 10B follows. At 1020, the offset is set equal to the difference obtained by subtracting 11 from the lesser of I1 and I2, and then the 10/11 flag is set (1012 in FIG. 10B).

If at 1016 it is determined that the absolute value of the difference between I1 and I2 is equal to 11, then 1022 in FIG. 10B follows. At 1022, it is determined whether the lesser of I1 and I2 is less than 11. If so, then the offset is set equal to the lesser of I1 and I2 (1024 in FIG. 10B) and the 10/11 flag is set (1012). If at 1022 it is determined that the lesser of I1 and I2 is not less than 11, then 1026 follows. At 1026, a parameter P is set to equal the difference between the offset sum having the index I3 (=the difference obtained by subtracting 10 from the lesser of I1 and I2) and the offset sum having the index I4 (=the difference obtained by subtracting 11 from the lesser of I1 and I2). At 1028 it is determined whether the parameter P is greater than zero. If so, then at 1030 the offset is set equal to the difference obtained by subtracting 11 from the lesser of I1 and I2, and the 10/11 flag is set (1012 in FIG. 10B). If P is not greater than zero, then at 1032 the offset is set equal to the difference obtained by subtracting 10 from the lesser of I1 and I2, and the 10/11 flag is set (1012 in FIG. 10B).

If the 10/11 flag is set, then the 10/11 grid size and the offset set in accordance with FIG. 10B are reported as the detected grid size and offset if the following 2 conditions are met:

Condition 3.1: The smallest of the offset sums is less than 0.2 times the largest of the offset sums.

Condition 3.2: The number of column totals that contributed to the offset sum for the offset indicated in FIG. 10B is greater than 0.1 times the image width (in columns) divided by 8.

If the 10/11 flag is not set or at least one of the 2 conditions just above is not met, then no horizontal grid is detected.

Figure 11:
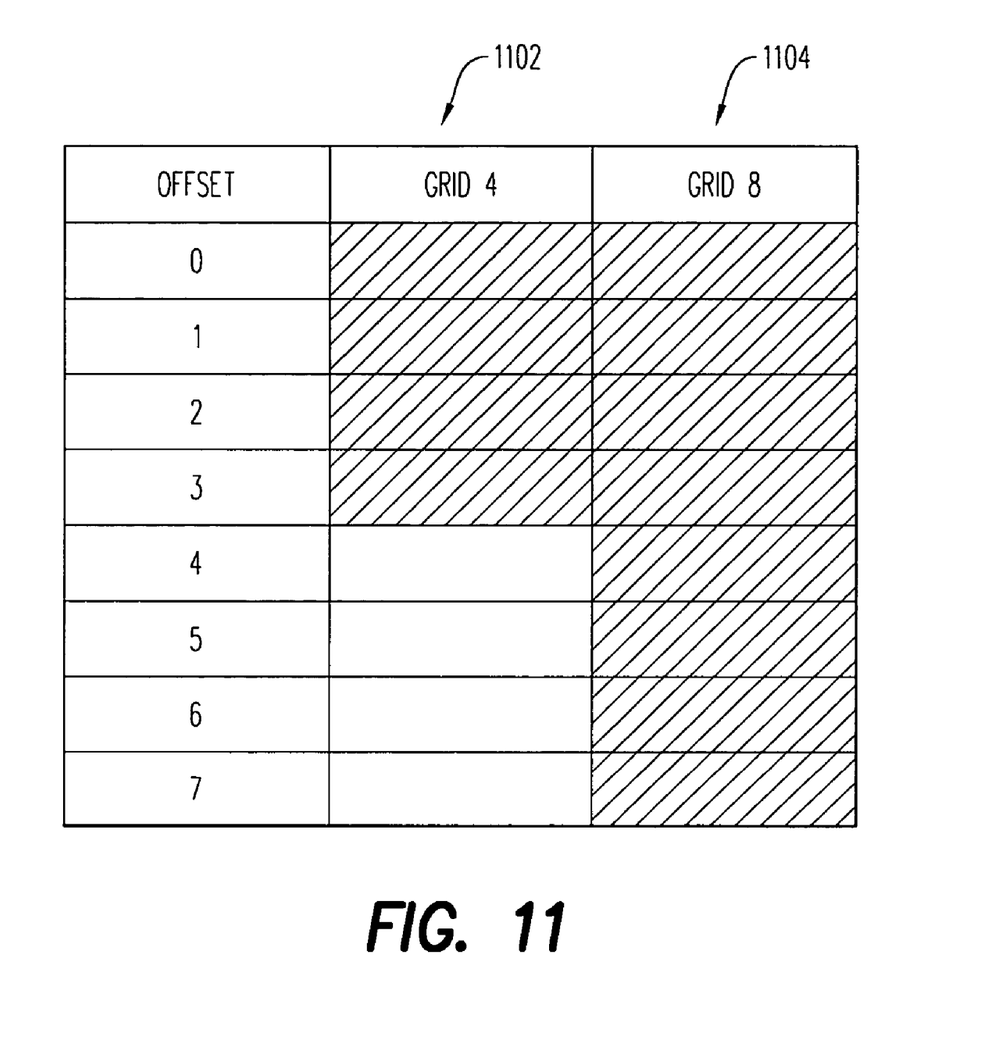
FIG. 11 is an example layout of another table used in the analysis of FIG. 7.

Referring to FIG. 11, it will be noted that this is an example table layout that may be used in the analysis of potential vertical grid sizes and offsets in connection with the process of FIG. 7. In the table of FIG. 11, the row totals for potential offset locations for a potential vertical grid size 4 are summed and the resulting sums are listed in the shaded cells in column 1102. Also, the totals for the potential offset locations for a potential vertical grid size 8 are listed in column 1104. The following formula may be applied: For the cell corresponding to potential grid size V and potential offset W, the entry is the sum of the row totals for the rows (W+1)+V*N, where N=0, 1, 2, ..., Q−1; Q being equal to the height of the image plane in rows, divided by V.

In analyzing the horizontal edge pixels (to find the vertical block grid size/offset), the table of FIG. 11 is examined to find the maximum (max_4_vert_index_sum) of the values listed in column 1102. The corresponding grid size (i.e., 4) and offset are selected as a candidate for the vertical grid size and offset to be determined by the block grid detection circuitry. The corresponding grid size/offset are indeed reported as the vertical grid size and offset to be found if the following 6 conditions are met:

Condition 4.1: The image being processed is a video signal field rather than a whole frame.

Condition 4.2: Max_4_vert_index_sum is greater than 1.4 times the maximum (max_8_vert_index_sum) of the values listed in column 1104.

Condition 4.3: Max_4_vert_index_sum is at least 1.15 times greater than each other value listed in column 1102.

Condition 4.4: The smallest value listed in column 1102 is less than 0.4 times max_4_vert_index_sum.

Condition 4.5: The number of row totals that contributed to max_4_vert_index_sum (i.e., the number of nonzero column totals that correspond to the offset that corresponds to max_4_vert_index_sum) is greater than 1.5 times the number of row totals that contributed to max_8_vert_index_sum.

Condition 4.6: The number of row totals that contributed to max_4_vert_index_sum is greater than 0.1 times one third of the image height divided by 8.

If at least one of the above 6 conditions is not met, then further analysis is performed to determine whether a vertical grid size of 8 is detected. Initially at this stage the grid size (i.e., 8) and the offset that correspond to max_8_vert_index_sum are selected as a candidate for the vertical grid size and offset to be determined by the block grid detection circuitry. This candidate is indeed reported as the grid size and offset to be found if the following three conditions are met:

Condition 5.1: Max_8_vert_index_sum is at least 1.15 greater than each other value listed in column 1104.

Condition 5.2: The minimum of the values listed in column 1104 is less than 0.35 times max_8_vert_index_sum.

Condition 5.3: The number of row totals that contributed to max_8_vert_index_sum is greater than 0.1 times one third of the image height divided by 8.

If at least one of these three conditions is not met, then no vertical grid is determined to have been found.

Referring once more to FIG. 7, once grid sizes/offsets, if any, have been found, a median function is applied (710 in FIG. 7) so that the output of the grid detection circuitry is the median of the set formed of the grid sizes/offsets for the current image and for the grid sizes/offsets for the last four images that were processed. The use of a median function tends to reduce the likelihood of "false positives" (i.e., "detection" of grids that are not actually present). Also, application of the various sets of conditions listed above may also be important in avoiding false positives.

In addition, in some embodiments, blocking artifact metrics may be calculated, as indicated at 712. The blocking artifact metrics may be useful in deciding whether blocking artifact reduction should be performed.

A horizontal blocking artifact metric (BAM_h) may be calculated according to the following formula:

$$BAM\_h = (\text{val}(\text{max\_offset\_h})/\text{nof\_counts\_h})/(\text{image\_width}*(2/3)),$$

where:

val(max_offset_h) is (a) max_8_horiz_index_sum if a horizontal grid size of 8 has been detected for the current image; (b) max_12_horiz_index_sum if a horizontal grid size of 12 has been detected for the current image; (c) the largest of the offset sums sorted at 1004 if a 10/11 grid is detected.

nof_counts_h is the number of column totals (nonzero) that contributed to:

(a) max_8_horiz_index_sum if a horizontal grid size of 8 has been detected, or (b) max_12_horiz_index_sum if a horizontal grid size of 12 has been detected, or (c) the largest of the offset sums sorted at 1004 if a 10/11 grid size is detected; and image_width is the width of the image plane in pixels.

A vertical blocking artifact metric (BAM_v) may be calculated according to the following formula:

$$BAM\_v = (\text{val}(\text{max\_offset\_v})/\text{nof\_counts\_v})/(\text{image\_height}*(2/3)),$$

where:

val(max_offset_v) is (a) max_4_vert_index_sum if a vertical grid size of 4 has been detected for the current image; (b) max_8_vert_index_sum if a vertical grid size of 8 has been detected for the current image;

nof_counts_v is the number of row totals (nonzero) that contributed to (a) max_4_vert_index_sum if a vertical grid size of 4 has been detected, or (b) max_8_vert_index_sum if a vertical grid size of 8 has been detected; and image_height is the height of the image plane in pixels.

These formulas effectively normalize the metrics by picture size and 2/3 so that the range of the metrics is between 0 and 1 (truncated to 1 in the unlikely event that the calculated metric exceeds 1). In effect, these formulas divide the average row/column total (for non-zero row/column totals at the detected grid size offset) by 2/3 of the image width/height. Thus, if the average row/column total referred to in the previous sentence is 2/3 of the picture width/height (i.e., a picture with a very high degree of blocking artifacts) then the metric value is 1.

Figure 12:
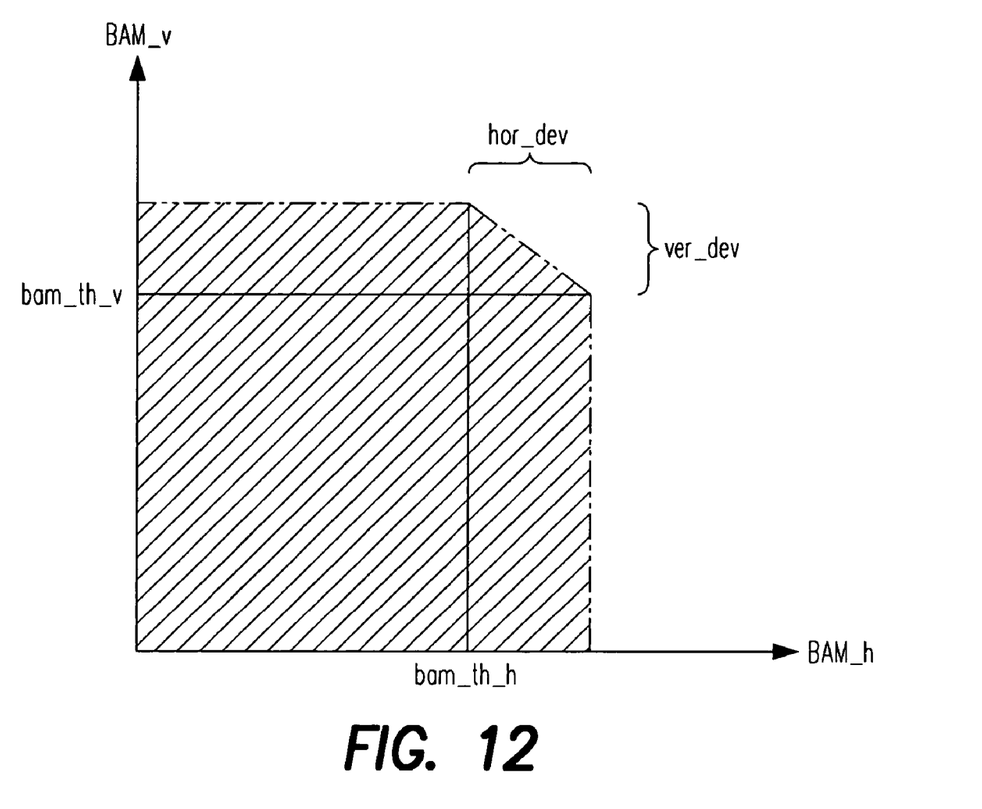
FIG. 12 graphically illustrates application of a blocking artifact metric in accordance with some embodiments.

FIG. 12 graphically illustrates how the block artifact metrics may be used to decide whether block artifact reduction processing is worthwhile. If the point represented by the calculated values of the blocking artifact metrics BAM_h and BAM_v falls within the shaded area, then the quantity of blocking artifacts in the current image may be considered so low that block reduction processing is not needed. The shaded area in FIG. 12 is defined with reference to a horizontal blocking artifact threshold bam_th_h and a vertical blocking artifact threshold bam_th_v, as well as deviation regions having a width, for blocking artifacts in the horizontal direction, of hor_dev, and a width, for blocking artifacts in the vertical direction, of ver_dev. In one embodiment, bam_th_h is set at 0.45, bam_th_v is set at 0.42, hor_dev and ver_dev are both set at 0.02.

In logical terms, the condition illustrated in FIG. 12 corresponds to refraining from blocking artifact reduction if the three following conditions are met:

Condition 6.1: BAM_h is less than (bam_th_h+hor_dev).
Condition 6.2: BAM_v is less than (bam_th_v+ver_dev).
Condition 6.3: ((BAM_h−bam_th_h)*ver_dev+(BAM_v−bam_th_v)*hor_dev) is less than (hor_dev*ver_dev).

In some embodiments, one or more additional thresholds may be set to indicate that if one or both of the blocking artifact metrics are sufficiently large, then there is such a high quantity of blocking artifacts in the current image that it is not worthwhile to perform blocking artifact reduction. In other words, in some embodiments, blocking artifact reduction is not performed if the level of blocking artifacts in the image, as indicated by the blocking artifact metrics, is either too low or too high.

In some embodiments, detection of edge pixels for block grid detection may be limited to less than all of the image plane. Moreover, it may be possible to implement the grid block detection processes described above by detecting edge pixels on a "stride by stride" basis, rather than continuously over the whole width of the image plane. The term "stride" refers to a portion of the image plane that extends fully from top to bottom of the image plane but less than all of the way across the image plane. Since completion of processing of a stride produces completed column totals for detected vertical edge pixels, the resulting totals can be used to update the table shown in FIG. 8 stride by stride, thereby allowing column arrays to be reused. Consequently, full size column total arrays may not be required.

The above-described grid detection processes, including use of the median function, have been found to produce quite reliable results, and may be suitable for guiding the operation of blocking artifact reduction circuits.

The block grid detection circuitry and/or the blocking artifact reduction circuit, or other blocks herein, may be implemented as application-specific logic circuitry or by one or more programmable processors controlled by software instructions stored in a memory or memories coupled to the processor or processors.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
   receiving a video signal from a video signal source, the video signal source being a video tuner, a satellite earth station or a DVD player;
   detecting vertical edge pixels in an image in the video signal;
   analyzing said detected vertical edge pixels by horizontal location in said image to detect a spatial periodicity in said detected vertical edge pixels;
   detecting horizontal edge pixels in said image;
   analyzing said detected horizontal edge pixels by vertical location in said image to detect a spatial periodicity in said detected horizontal edge pixels;
   post-processing said image based on results of said analyzing steps; and
   displaying said post-processed image on a display device;
   wherein:
   said detecting vertical edge pixels includes, with respect to a target pixel:
      calculating a first difference $\Delta 1$ as an absolute value of a difference between a value of the target pixel and a value of a first pixel that is immediately to the left of the target pixel;
      calculating a second difference $\Delta 0$ as an absolute value of a difference between the value of said first pixel and a value of a second pixel that is immediately to the left of the first pixel;
      calculating a third difference $\Delta 2$ as an absolute value of a difference between the value of the target pixel and a value of a third pixel that is immediately to the right of the target pixel; and
   classifying the target pixel as an edge pixel if and only if all of the following conditions are met:
      (a) the first difference $\Delta 1$ is less than a threshold;
      (b) the first difference $\Delta 1$ is greater than the second difference $\Delta 0$; and
      (c) the first difference $\Delta 1$ is greater than the third difference $\Delta 2$.

2. The method of claim 1, wherein said analyzing said detected vertical edge pixels includes counting said detected vertical edge pixels in each of a plurality of columns of pixels in said image to produce column totals.

3. The method of claim 2, wherein said analyzing said detected vertical edge pixels further includes summing said column totals at regular horizontal intervals to produce offset index sums.

4. The method of claim 3, wherein said analyzing said detected vertical edge pixels further includes comparing said offset index sums with each other.

5. The method of claim 4, wherein said analyzing said detected vertical edge pixels further includes comparing a greatest one of said offset index sums with a threshold.

6. The method of claim 5, further comprising:
   calculating a blocking artifact metric based on said greatest one of said offset index sums.

7. A system comprising:
   a source of a video signal;
   a block grid detection circuit coupled to the source of the video signal; and
   a blocking artifact reduction circuit coupled to the source of the video signal and to the block grid detection circuit;
   the block grid detection circuit operative to:
      detect vertical edge pixels in an image;
      accumulate counts of the detected vertical edge pixels in said image;
      analyze said counts by horizontal location in said image to detect a spatial periodicity in said detected vertical edge pixels;
      detect horizontal edge pixels in said image;
      accumulate counts of the detected horizontal edge pixels in said image; and analyze said counts of horizontal edge pixels by vertical location in said image to detect a spatial periodicity in said detected horizontal edge pixels;

wherein:

said detecting vertical edge pixels includes, with respect to a target pixel:

calculating a first difference $\Delta 1$ as an absolute value of a difference between a value of the target pixel and a value of a first pixel that is immediately to the left of the target pixel;

calculating a second difference $\Delta 0$ as an absolute value of a difference between the value of said first pixel and a value of a second pixel that is immediately to the left of the first pixel;

calculating a third difference $\Delta 2$ as an absolute value of a difference between the value of the target pixel and a value of a third pixel that is immediately to the right of the target pixel; and classifying the target pixel as an edge pixel if and only if all of the following conditions are met:

(a) the first difference $\Delta 1$ is less than a threshold;

(b) the first difference $\Delta 1$ is greater than the second difference $\Delta 0$ ; and (c) the first difference $\Delta 1$ is greater than the third difference $\Delta 2$.

8. The system of claim 7, wherein said analyzing said counts of vertical edge pixels includes counting said detected vertical edge pixels in each of a plurality of columns of pixels in said image to produce column totals.

9. The system of claim 8, wherein said analyzing said counts of vertical edge pixels further includes summing said column totals at regular horizontal intervals to produce offset index sums.

10. The system of claim 9, wherein said analyzing said counts of vertical edge pixels further includes comparing said offset index sums with each other.

11. The system of claim 10, wherein said analyzing said counts of vertical edge pixels further includes comparing a greatest one of said offset index sums with a threshold.

12. The system of claim 11, wherein the block grid detection circuit is further operative to:

calculate a blocking artifact metric based on said greatest one of said offset index sums.

13. A method comprising:

receiving a video signal from a video signal source, the video signal source being a video tuner, a satellite earth station or a DVD player;

detecting vertical edge pixels in an image in the video signal;

accumulating counts of said detected vertical edge pixels in each of 32 groups of columns of pixels of the image, each of the groups of columns corresponding to an offset modulo 32 in a horizontal direction;

determining a respective index for each of four groups of columns having larger counts of vertical edge pixels accumulated therein than any group of columns that is not one of the four groups;

determining whether any two of the determined indices differ by 21 or 22;

post-processing said image based on results of said determining steps; and displaying said post-processed image on a display device;

wherein:

said detecting vertical edge pixels includes, with respect to a target pixel:

calculating a first difference $\Delta 1$ as an absolute value of a difference between a value of the target pixel and a value of a first pixel that is immediately to the left of the target pixel;

calculating a second difference $\Delta 0$ as an absolute value of a difference between the value of said first pixel and a value of a second pixel that is immediately to the left of the first pixel;

calculating a third difference $\Delta 2$ as an absolute value of a difference between the value of the target pixel and a value of a third pixel that is immediately to the right of the target pixel; and classifying the target pixel as an edge pixel if and only if all of the following conditions are met:

(a) the first difference $\Delta 1$ is less than a threshold;

(b) the first difference $\Delta 1$ is greater than the second difference $\Delta 0$ ; and (c) the first difference $\Delta 1$ is greater than the third difference $\Delta 2$.

14. The method of claim 13, further comprising:

determining a respective index for each of two of the four groups of columns, said two of the four groups of columns having the two largest counts of vertical edge pixels of the four groups of columns.

15. The method of claim 14, further comprising:

determining whether the determined indices of the two of the four groups of columns differ by 10 or 11.

* * * * *